(12) United States Patent
Seksaria et al.

(10) Patent No.: US 8,052,198 B2
(45) Date of Patent: Nov. 8, 2011

(54) PEDESTRIAN SAFE AUTOMOTIVE HOOD HAVING REINFORCING FOAM

(75) Inventors: Dinesh C. Seksaria, Novi, MI (US); John W. Cobes, Jr., Lower Burrell, PA (US); Sherri F. McCleary, Apollo, PA (US); Stephen Paul Sunday, Richmond, VA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 12/530,021

(22) PCT Filed: Mar. 7, 2008

(86) PCT No.: PCT/US2008/056181
§ 371 (c)(1),
(2), (4) Date: Feb. 24, 2010

(87) PCT Pub. No.: WO2008/109811
PCT Pub. Date: Sep. 12, 2008

(65) Prior Publication Data
US 2010/0140979 A1    Jun. 10, 2010

Related U.S. Application Data

(60) Provisional application No. 60/893,489, filed on Mar. 7, 2007.

(51) Int. Cl.
*B60J 7/00* (2006.01)
(52) U.S. Cl. ........... 296/187.04; 296/193.11; 180/69.22; 180/69.2
(58) Field of Classification Search ............. 296/187.04, 296/193.11; 180/69.2, 69.22
See application file for complete search history.

(56) References Cited

U.S. PATENT DOCUMENTS

| | | | |
|---|---|---|---|
| 3,011,602 A | 12/1961 | Ensrud et al. |
| 3,227,598 A | 1/1966 | Robb |
| 3,507,634 A | 4/1970 | O'Driscoll |
| 3,876,492 A | 4/1975 | Schott |

(Continued)

FOREIGN PATENT DOCUMENTS

DE    10064345    6/2002

(Continued)

OTHER PUBLICATIONS

European Office Action dated Dec. 14, 2009 from European Application No. 08 731 645.1.

(Continued)

*Primary Examiner* — Joseph Pape
(74) *Attorney, Agent, or Firm* — Greenberg Traurig LLP (57) ABSTRACT

The present invention provides a thin vehicle closure panel design that substantially reduces a thickness (panel gauge plus the perpendicular distance or depth between the panels) of a vehicle hood (5) and the impact effect on the head of a pedestrian struck by a motor vehicle. In one embodiment, the vehicle hood (5) includes a hood shell (15) including an outer panel (25) and an inner panel (20); a unitary foam core (100) positioned between and bonded to the outer (25) and/or the inner panel (20) of the hood shell (15); and at least one recess (10) that corresponds to an underhood component (42). In another aspect of the invention, a vehicle hood (5) is provided in which a latch attachment member (60) and/or hinge members (70) are attached to inner surface (50) of the inner panel (20) of the hood shell (15).

20 Claims, 7 Drawing Sheets

U.S. PATENT DOCUMENTS

| | | | |
|---|---|---|---|
| 3,925,526 | A | 12/1975 | Haas |
| 4,288,490 | A | 9/1981 | Alfter et al. |
| 4,950,522 | A | 8/1990 | Vogt et al. |
| 5,013,597 | A | 5/1991 | Kracke |
| 5,193,636 | A | 3/1993 | Holm |
| 5,244,745 | A | 9/1993 | Seksaria et al. |
| 5,649,400 | A | 7/1997 | Miwa |
| 6,012,764 | A | 1/2000 | Seksaria et al. |
| 6,199,942 | B1 | 3/2001 | Carroll, III et al. |
| 6,247,745 | B1 | 6/2001 | Carroll, III et al. |
| 6,306,507 | B1 | 10/2001 | Brunelle et al. |
| 6,565,148 | B1 | 5/2003 | Teramoto et al. |
| 6,641,209 | B2 | 11/2003 | Warwel et al. |
| 6,773,756 | B2 | 8/2004 | Meyer-Ahrens et al. |
| 6,848,738 | B2 * | 2/2005 | Kempf et al. ............ 296/187.04 |
| 6,883,627 | B1 | 4/2005 | Staines et al. |
| 6,945,593 | B2 | 9/2005 | Andre et al. |
| 6,988,757 | B2 | 1/2006 | McLaren et al. |
| 7,104,350 | B2 | 9/2006 | Brown et al. |
| 7,114,765 | B2 * | 10/2006 | Ishikawa et al. ......... 296/193.11 |
| 7,140,673 | B2 | 11/2006 | Ito et al. |
| 7,143,852 | B2 | 12/2006 | Yatsuda et al. |
| 2004/0041429 | A1 | 3/2004 | McLaren et al. |
| 2005/0211484 | A1 | 9/2005 | Ellerman |
| 2005/0257980 | A1 | 11/2005 | Green et al. |
| 2005/0280287 | A1 | 12/2005 | Koura |
| 2006/0006698 | A1 | 1/2006 | Ishikawa et al. |

FOREIGN PATENT DOCUMENTS

| | | |
|---|---|---|
| DE | 102004061303 | 8/2005 |
| EP | 1022199 | 7/2000 |
| EP | 1510408 | 3/2005 |
| EP | 1527984 | 5/2005 |
| JP | 06239268 | 8/1994 |
| JP | 2003191865 | 7/2003 |

OTHER PUBLICATIONS

International Search Report dated Nov. 26, 2008 from International Application No. PCT/US2008/056181.

International Preliminary Report on Patentability dated Sep. 8, 2009 from International Application No. PCT/US2008/056181.

* cited by examiner

PEDESTRIAN SAFE AUTOMOTIVE HOOD HAVING REINFORCING FOAM

CROSS REFERENCE TO RELATED APPLICATIONS

This application is a national phase filing under 35 U.S.C. 371 of International Application No. PCT/US2008/056181, filed on Mar. 7, 2008, which claims the benefit of U.S. Provisional Application No. 60/893,489 filed Mar. 7, 2007, the entirety of which is hereby incorporated herein by reference for the teachings therein.

FIELD OF THE INVENTION

In one embodiment, the present invention relates to vehicle closure panels, and in an even further embodiment to a vehicle closure panel designed to minimize the thickness of the hood and to minimize the effect of a collision between a pedestrian head and a vehicle in an impact event.

BACKGROUND OF THE INVENTION

Accidents in which a motor vehicle strikes a pedestrian present a serious safety risk to pedestrians. One type of pedestrian/vehicle accident that is particularly harmful occurs when the vehicle's frontal portion impacts the pedestrian's knee, leg, and/or abdominal region. This frontal impact potentially harms the pedestrian's knee, leg, and/or abdominal region. Additionally, this frontal impact may also elevate and/or flip the pedestrian such that the pedestrian's head strikes the vehicle's hood or windshield. This impact may be fatal if the head suffers trauma.

Various regulatory bodies around the world have established standards that car manufacturers must meet to reduce this type of head injury to pedestrians. The European Union has developed a test standard referred to as EURONCAP EEVC WG17 [2] ACEA[1]. Another standard adopted in Japan is referred to as JNCAP. In one example, the standard requires that a head injury criteria number (HIC#) not exceed 1000. The HIC# is dependent on the force and duration of the impulse experienced by the human head against the vehicle hood in a pedestrian and vehicle impact. During a pedestrian impact the head may experience 80-150 g's (1 g=32 ft/sec$^2$).

SUMMARY OF THE INVENTION

In one embodiment, a vehicle closure panel (interchangeably referred to as vehicle hood) design is provided of hybrid material construction including a unitary foam core positioned between the inner and outer sheet metal layers of the vehicle hood to maintain the distance between the panels substantially the same. The unitary foam core acts to keep the panels apart. The unitary foam core can be substantial incompressible upon immediate impact by, for example, a pedestrian's head. However, the unitary form core can compress under a sustained load condition. This sandwich arrangement provides for a substantially rigid relationship between the panels such that the panels and unitary foam will act in unison or as one single body and flex or deflect about the same upon impact. As long as the panels do not contact each other, the panels will not substantially deform after impact, except for the possible localized dent that may occur at the impact point on the outer surface of the outer panel.

The vehicle closure panel of the present invention includes:
a hood shell including an outer panel and an inner panel; and
a unitary foam core positioned between the outer and the inner panel of the hood shell.

In another embodiment of the present invention a vehicle hood including:
a hood shell formed by an outer panel and an inner panel, wherein each of the panels have a uniform gauge thickness therethrough (where the panels can be of different gauge relative to each other), wherein at least one gap is formed between an inner surface of the outer panel and an outer surface of the inner panel;
a unitary foam core substantially filling the at least one gap and being substantially sealed within the at least one gap when the hood receives an external force or object, wherein the unitary foam core is bonded to the inner surface of the outer panel or the outer surface of the inner panel without defined crumple zones within the at least one gap where points of weakness deform and crumple first when impacted by the external force or object; and
wherein the inner panel comprises at least one recess positioned to be substantially aligned with an underhood component when the hood is installed on a vehicle to maximize the clearance between the outer surface of the inner panel and an upper surface of the underhood component to allow for elastic deformation of the at least one recess when impacted by the external force or object that minimizes the incidence of contact of the outer surface of the inner panel to the underhood component,
whereby the force at which the pedestrian's head contacts the hood is reduced.

In one embodiment, the hood shell includes an inner and an outer panel that is composed of an aluminum alloy. In one embodiment, the gauge of the inner and outer panel of the hood shell may be on the order of approximately 0.7 mm and uniform gauge therethrough the entire panel. In an even further embodiment, the uniform gauge of the inner panel may range from approximately 0.65 mm to approximately 1.0 mm. In one embodiment, the inner and outer panel of the hood shell are separated by less than approximately 15.0 mm at the greatest degree of separation between the inner and outer panels. In an even further embodiment, the depth of cross section of the hood shell may be on the order of approximately 8 mm to approximately 15 mm.

In one embodiment, the unitary foam core may be a polymeric material including, but not being limited to, polyurethane, polystyrene, polypropylene or combinations thereof. In one embodiment, the unitary foam core may be composed of a heat activated expandable polymer. In another embodiment, the unitary foam core may be a thermoset or thermoplastic polymer.

In one embodiment, the unitary foam core is positioned between and can be bonded or adhered to the inner and/or outer panels of the hood shell enhancing the hood's structural stiffness and resistance to denting and dimpling. In one embodiment, the increased stiffness provided by the unitary foam core permits that the degree of separation between the inner and outer layers that provide the hood shell of the vehicle hood be substantially reduced. By utilizing the unitary foam core to increase the stiffness of the hood shell, the inner and outer panels of the hood shell may be brought closer together to provide a hood shell having a smaller depth of cross section than possible in hood designs not utilizing the unitary foam core.

In one embodiment, the unitary foam core substantially fills the volume between the outer and inner panel of the hood shell at predetermined locations. In another embodiment, the unitary foam core substantially fills the volume between the outer and inner panel of the hood shell that is not occupied by hood mechanisms being housed within the hood shell. In one embodiment, the hood mechanisms may include, but are not limited to, latch assembly components, and hinge assembly components. In yet another embodiment, stiffening of the hood shell with the unitary foam core allows for reduction in the gauge of sheet used to provide the inner and outer panels. In yet another embodiment, the unitary foam core may be selectively placed in gap regions with some gap regions not being filled with foam.

In one embodiment, the unitary foam core by stiffening the hood shell and allowing for a reduction in the degree of separation between the inner and outer layers that compose the hood shell provides for increased clearance between the vehicle hood and the underhood components. The increased clearance allows for the vehicle hood to deform and absorb at least most of the impact energy between a pedestrian head and the vehicle hood that results from an impact event.

In one aspect of the present invention, the hood further includes plastic deformation regions defined by a deformable pan incorporated into the inner panel and positioned corresponding to an underhood component, wherein the deformable pan provides further clearance between the vehicle hood and the underhood component. In one embodiment, of the vehicle closure panel of the present invention includes:

a hood shell including an outer panel and an inner panel;

a unitary foam core positioned between and bonded or adhered to the outer and/or the inner panel of the hood shell; and at least one deformable pan having an upper surface that is a layered structure of the inner panel of the hood shell and the outer panel of the hood shell, wherein the at least one deformable pan corresponds to an underhood component.

In one embodiment, the deformable pan includes dimensions to provide further clearance between the deformable pan's upper surface and an underhood component in order to allow for deformation of the structure during a head impact event, while minimizing the incidence of contact between the vehicle hood and the underhood component. In the event the vehicle hood contacts the underhood component during an impact event, the hood design of the present invention minimizes the velocity of the pedestrian head prior to contacting the underhood component. In one embodiment, the underhood component includes an engine, such as the upper surface of the engine.

In one embodiment, the layered structure of the inner panel and the outer panel of the hood shell that provides the upper surface of the deformable pan is produced by lamination of the inner panel and the outer panel at the deformable pan upper surface. In another embodiment, the deformable pan has a circular or multi-sided configuration. In yet another embodiment, the deformable pan has sidewalls with a substantially S-shaped side cross section.

In one embodiment, the deformable pan further includes a plurality of energy absorbing features having a geometry of at least a portion of a sphere and being less than a hemisphere, in which the apex of the sphere faces the underhood component. In one example, in the event the deformable pan contacts the underhood component the energy absorbing features reduce the force of the impact to the pedestrian's head.

In another aspect of the present invention, a vehicle hood is provided in which the hinge and latch attachments are connected to the inner surface of the inner panel of the hood shell, therefore reducing the distance separating the inner and outer panels of the shell and reducing the overall depth of draw required to manufacture the inner panel.

In one embodiment, the vehicle closure panel includes:

a hood shell including an inner panel and an outer panel, the hood shell including at least one stiffening structure with an S-shaped sidewall and a palm reinforcement portion positioned at a front portion of the hood shell, wherein the stiffening structure and the palm reinforcement have a side cross section in which an outside surface of the inner panel of the hood shell is bonded to an inner surface of the outer panel of the hood shell;

a unitary foam core positioned between the outer and the inner panel of the hood shell;

a latch attachment member position on the outer surface of the inner panel at a first end of the shell corresponding to the palm reinforcement portion; and a hinge attachment member positioned on the outer surface of the inner panel at a second end of the shell.

In one embodiment, the latch attachment member may include reinforcements for a latch loop assembly and may further provide provisions for mounting bumper pads and related hardware to ensure proper engagement and alignment of the hood structure with the vehicle body when in the closed position. The portion of the hood shell corresponding to the palm reinforcement portion has a reduced cross section, in which the inner panel may be separated from the outer panel on the order of approximately 0.5 mm to approximately 3.0 mm. As opposed to prior hood assemblies that incorporate separate palm reinforcing members and latch attachments between the inner and outer panel of the hood shell and having a depth on the order of approximately 60 mm or greater, in one embodiment of the present invention, the depth of draw for the inner panel of the hood shell is less than approximately 18 mm.

In one embodiment, the bonding between the inner and outer panels at the palm reinforcement portion and the stiffening structures may be an adhesive bond. In another embodiment, the bonding between the inner and outer panels at the palm reinforcing portion and the stiffening structure may be provided by the foam material of the unitary foam core.

In one aspect of the present invention, by reducing the depth of draw for the portion of the hood shell corresponding to the palm reinforcement area, the stiffening structures may be moved in closer proximity to the portions of the hood shell corresponding to the palm reinforcement area than was previously possible with prior hood designs having palm reinforcement structures positioned within the hood shell. In one embodiment, the latch attachment is engaged to the inner surface of the inner panel between the palm reinforcement portion of the inner panel and a portion of the inner panel that is in close proximity to the base of at least one stiffening structure.

In one embodiment, the deformable pan may be incorporated into the vehicle closure panel that includes the hinge, palm and/or latch attachment members that are attached to the inner surface of the inner panel of the shell.

In another aspect of the present invention, a method of forming a vehicle hood is provided, in which the vehicle hood has a unitary foam core positioned between and bonded to the outer and/or the inner panel of the hood shell. One method includes the steps of:

providing an outer panel having an inside surface;

providing an inner panel having deformable pan portion including a upper surface for engaging a portion of the outer panel and an S-shaped sidewall;

providing a foam material between the outer surface of the inner panel and the inside surface of the outer panel, wherein the outer surface of the inner panel opposes the inside surface of the outer panel;

joining the outer panel and the inner panel to provide a hood shell, wherein the deformable pan is positioned corresponding to an underhood component; and activating the foam material to engage the inner and outer panel of the hood shell.

In one embodiment, the method further includes providing a deformable pan in the inner panel corresponding to an underhood component. In another embodiment, the method further includes joining a latch attachment member to an outer surface of the inner panel at a first end of the shell, and joining a hinge attachment member to an outer surface of the inner panel at a second end of the shell.

BRIEF DESCRIPTION OF THE DRAWINGS

The following detailed description, given by way of example and not intended to limit the invention solely thereto, will best be appreciated in conjunction with the accompanying drawings, wherein like reference numerals denote like elements and parts, in which.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 1A:
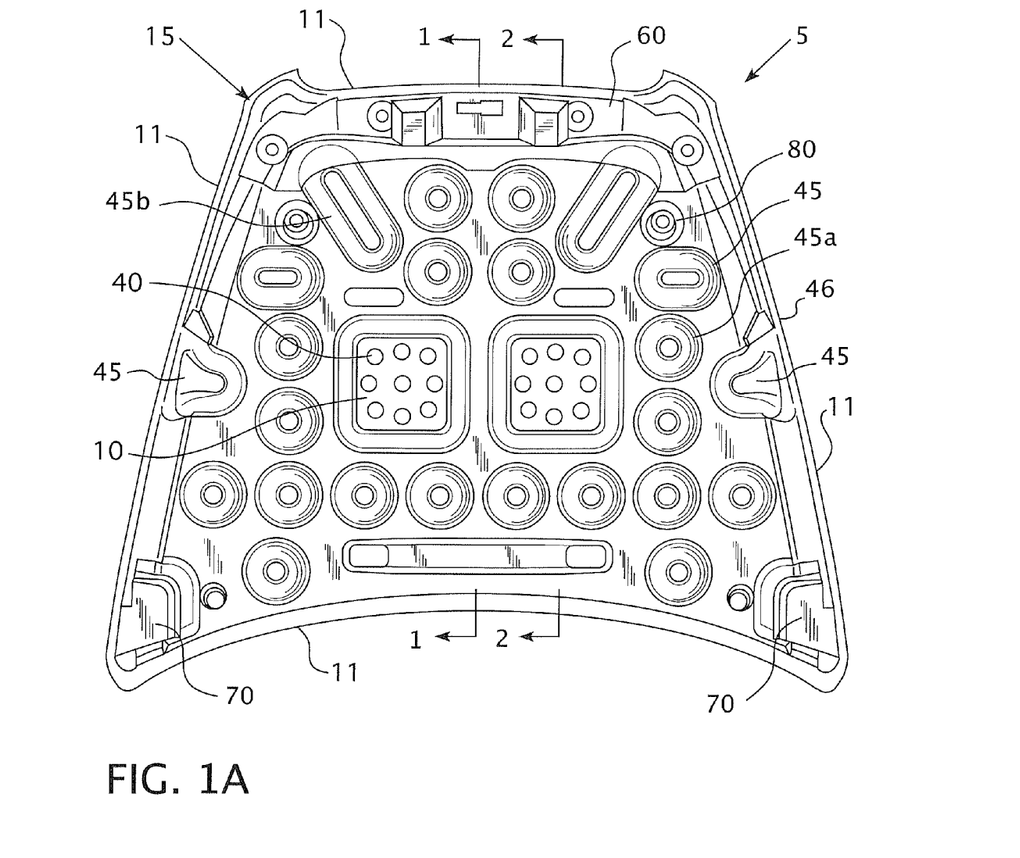
FIG. 1A is a bottom view of one embodiment of a vehicle hood including a deformable pan and externally mounted hinge and latch attachment members, in accordance with the invention.
Figure 1B:
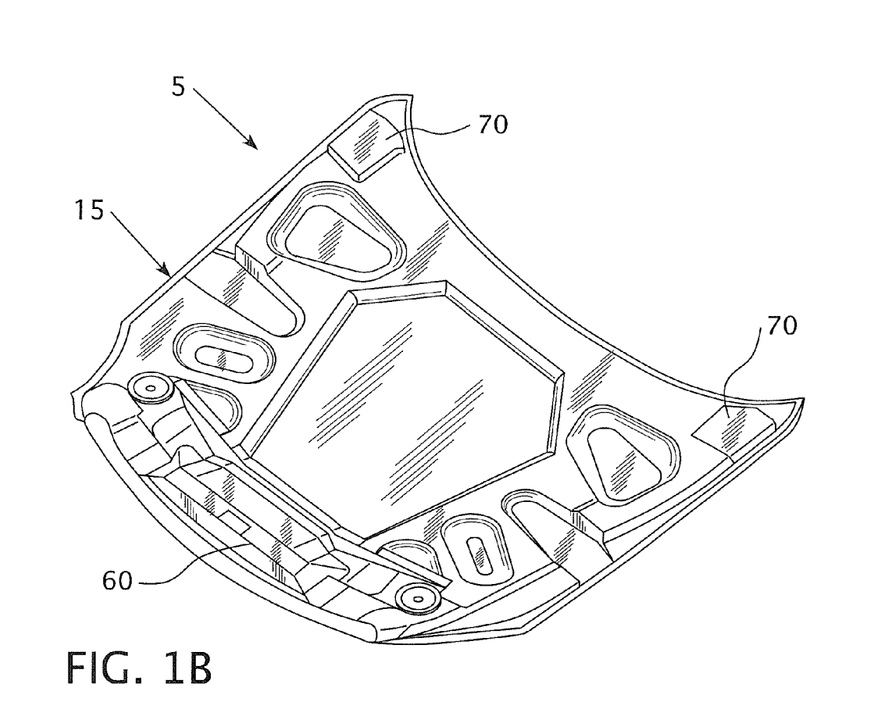
FIG. 1B is a bottom view of another embodiment of vehicle hood including a deformable pan and externally mounted hinge and latch attachment members, in accordance with the invention.
Figure 1C:
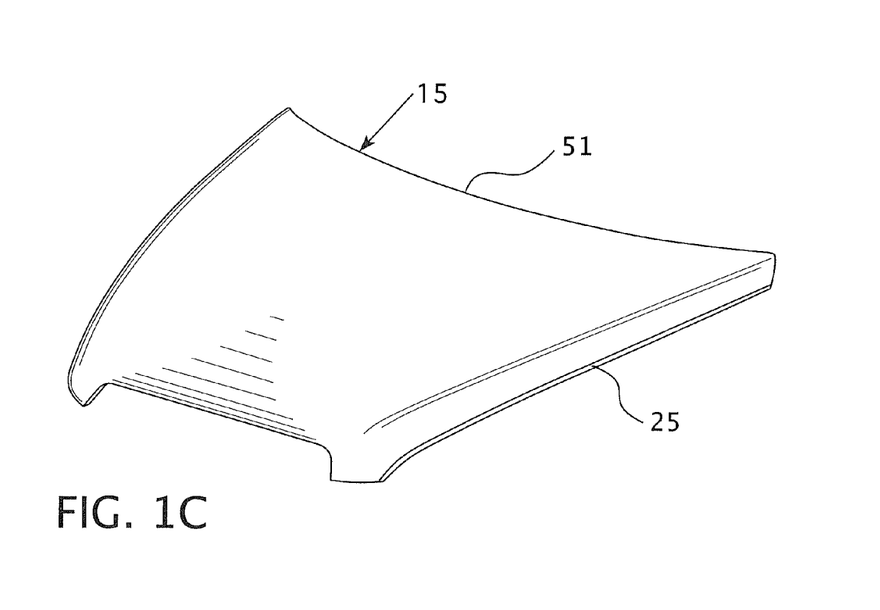
FIG. 1C is a top view of one embodiment of a vehicle hood.

FIGS. 1A-1C depict one embodiment of a vehicle hood 5 including a unitary foam core 100 (not shown) and at least one deformable pan 10 positioned to be substantially aligned to an underhood component, in accordance with the present invention. The vehicle hood 5 substantially reduces the probability of substantial pedestrian head injury in an impact event against the hood by providing a hood design that allows for sufficient deformation between the hood and underhood components, while maintaining sufficient hood strength and stiffness.

The vehicle closure panel is shown as a vehicle hood 5, but other vehicle closure panels have been contemplated, such as trunk lids, and are within the scope of the present disclosure. Although, the following drawings and description generally relate to hood structures, the description is equally applicable to other vehicle closure panels.

Referring to FIGS. 2A, 2B, 5 and 6, in one embodiment, a vehicle hood 5 is provided of hybrid material construction including a unitary foam core 100 positioned between the inner and outer panels 20, 25 of the hood shell 15. The unitary foam core 100 is a single structure that does not include defined crumple zones where points of weakness deform and crumple first when impacted by the external force or object. In one embodiment, the hood shell 15 is formed of a sheet material, such as a metal sheet material, including but not limited to an aluminum alloy, such as an Aluminum Association 6xxx series alloy, such as Aluminum Association 6022, or such as an Aluminum Association 5xxx series alloy, such as Aluminum Association 5182. The strength and stiffness of the hood design increases with increasing sheet thickness, but disadvantageously at the expense of increased weight and cost. It is further noted that the thickness of the sheet used to form the hood shell 15 should have a thickness that provides sufficient dent resistance. In an even further embodiment, the hood shell 15 may be formed of other metals, such as steel, and other materials, such as high strength polymers and composite materials.

For the purposes of this disclosure, the terms selected to define the surfaces of the inner panel 20 and outer panel 25 are consistent with their use in the automotive industry. More specifically, in the automotive industry the inner and outer surfaces of the hood shell panels are referenced in relation to the positioning of the panel assembly in car position, wherein the outer surfaces having the better surface finish are contacted by the die and the inner surfaces are contacted by the punch. During typical hood shell 15 manufacturing the outer surface is positioned as the exterior surface of outer panel of the hood shell to take advantage of the surface quality provided by the stamping die. Conventionally, the outer surface of the inner panel is positioned facing the inside surface of the outer panel.

Figure 2A:
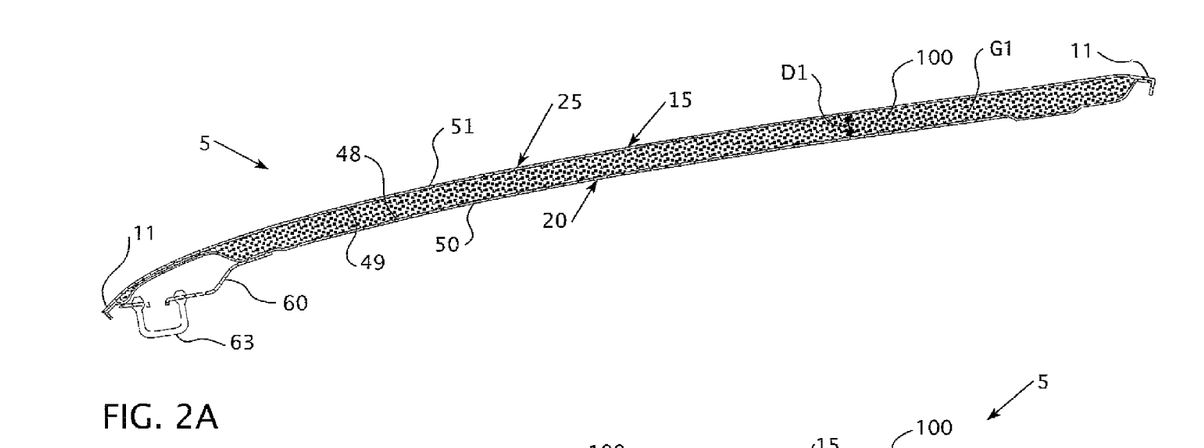
FIG. 2A is a side cross sectional view of the vehicle hood depicted in FIG. 1A along section line 1-1 and illustrating the unitary foam core.

More specifically, referring to FIG. 2A, the outer surface of the outer panel 25 is indicated by reference number 51; the inner surface of the outer panel 25 is indicated by reference number 49; the outer surface of the inner panel 20 is indicated by reference number 48; and the inner surface of the inner panel 20 is indicated by reference number 50. It is noted that the above terminology relative to the inner and outer panel surfaces is provided for illustrative purposes only and is not intended to limit the invention to the above described metal stamping, process as other manufacturing methods have been contemplated and are within the scope of the present invention.

Continuing with FIG. 2A, in one embodiment the outer surface 48 of the inner panel 20 may be separated by its greatest dimension or distance or depth from the inner surface 49 of the outer panel 25 by a substantially perpendicular or orthogonal depth D1 of less than approximately 15 mm. In another embodiment, the greatest dimension D1 separating the inner panel 20 from the outer panel 25 may range from approximately 8 mm to approximately 15 mm. In yet another embodiment, the greatest dimension D1 separating the inner panel 20 from the outer panel 25 may be on the order of approximately 12 mm. The perimeter portions 11 (FIG. 1A) of the inner panel 20 and outer panel 25 of the hood shell 15 may be joined by hemmed engagement and may be adhesively bonded. In one example, the adhesive used to bond the hemmed portion is a single component epoxy based adhesive. It is noted that other methods have been contemplated for joining the perimeter portions 11 of the hood shell 15, including but not limited to downstanding flange, as well as fastening methods, including but not limited to mechanical fasteners and welding.

The unitary foam core 100 is positioned between the inner and outer panels 20, 25 of the hood shell 15 increasing the hood's structural stiffness and resistance to denting and dimpling. In one embodiment, the unitary foam core 100 may be bonded to at least one of the inner and outer panels 20, 25 of the vehicle hood shell 15. In one preferred embodiment, the increased stiffness provided by the unitary foam core 100 permits that the degree of separation D1 between the inner and outer panels 20, 25 that compose the hood shell 15 of the vehicle hood 5 be substantially reduced.

In one embodiment, the hybrid closure panel of the present invention includes a hood shell 15 including an outer panel 25 and an inner panel 20 and a unitary foam core 100 positioned between and bonded to the outer and/or the inner panel 25, 20 of the hood shell 15. By utilizing the unitary foam core 100 to increase the stiffness of the hood shell 15, the inner and outer panels 20, 25 of the hood shell 15 may be brought closer together to provide a hood shell 15 having a smaller depth of cross section than possible in embodiments not utilizing the unitary foam core 100. In one embodiment, the cross sectional thickness D1 of the hood may be on the order of about 8 mm to about 12 mm, as opposed to traditional beam hoods having a cross section thickness on the order of about 50 mm or greater.

Stiffening of the hood shell 15 with the unitary foam core 100 and the support provided by the unitary foam core 100 allows for reduction in the gauge of sheet used to provide the inner and outer panels 20, 25. In one example, the gauge of the aluminum sheet used in forming the inner and outer panels 20, 25 may be minimized to a value within the range of approximately 0.65 to approximately 0.9 mm, as opposed to the range of approximately 0.85 mm to 1.1 mm as used in traditional automotive sheet applications.

Figure 2B:
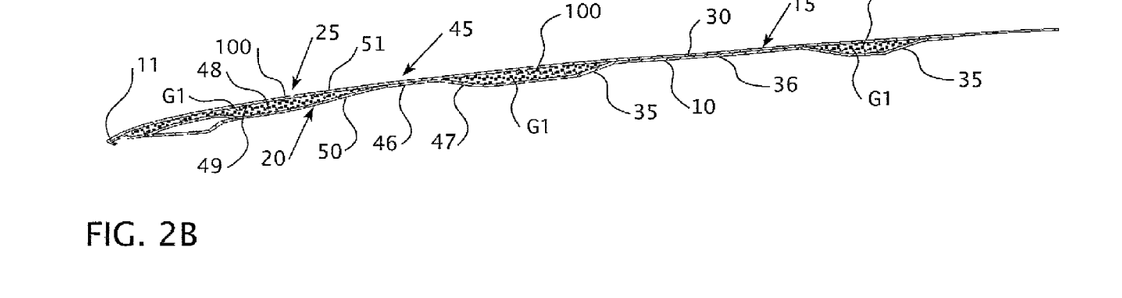
FIG. 2B is a side cross sectional view of the vehicle hood depicted in FIG. 1A along section line 2-2 and illustrating the unitary foam core.

Referring to FIGS. 2A and 2B, in one embodiment, the unitary foam core 100 by stiffening the hood shell 15 and allowing for a reduction in the degree of separation D1 between the inner and outer layers 20, 25 that compose the hood shell 15 provides for increased clearance between the vehicle hood 15 and the underhood component. The increased clearance allows for the vehicle hood 5 to deform and move in a manner that absorbs at least most of the impact energy between a pedestrian head 5 and the vehicle hood that results from an impact event. In one embodiment, the unitary foam core 100 contacts both of the inner and outer panels 20, 25 of the hood shell 15.

In one embodiment, the unitary foam core 100 contacts both the inner and out panels 20, 25 of the hood shell 15 so that there is substantially no space between the unitary foam core 100 and the inner surface 49 of the outer panel 25 and the outer surface 48 of the inner panel 20. The foam material of one embodiment of the unitary foam core 100 provides secure engagement by expanding and bonding to the inner surface 49 of the outer panel 25 and the outer surface 48 of the inner panel 20 upon activation of the foam material. As used in the present invention, the terms "activated" and "activation" denote that the expandable material can be activated to cure (e.g. thermoset), expand (e.g. foam), soften, flow or a combination thereof. In one embodiment, an expandable material may have volumetric range of expansion ranging from approximately 100% to 1000%.

In one embodiment of the present invention, the foam material expands upon activation in adhesive engagement with the interior surface of the hood shell 15. In one embodiment, the hood shell 15 is provided, the foam material is injected into the hood shell 15 and the foam material is activated by chemical reaction, expanding and bonding to the inner surface 49 of the outer panel 25 and the outer surface 48 of the inner panel 20. In one embodiment, a blank of foam material is provided and positioned between the inner and outer panel 20, 25 during assembly of the hood shell 15. Thereafter, the blank of foam material is activated to cause expansion and bonding to the inner surface 49 of the outer panel 25 and the outer surface 48 of the outer panel 20, wherein in one embodiment the blank of foam material may be heat activated.

In another embodiment, the unitary foam core 100 is molded and then anchored within the hood shell 15 by a compressive engagement through contact to the inner surface 49 of the outer panel 25 and the outer surface 48 of the inner panel 20. In another embodiment, the unitary foam core 100 may be molded and then anchored to the hood shell 15 by an adhesive engagement, wherein the unitary foam core 100 may be adhesively bonded to at least one of the inner and outer panel 20, 25. In another embodiment, the unitary foam core 100 may be molded and then anchored to the hood shell 15 by a combination of compressive and adhesive engagement. In another embodiment, the unitary foam core 100 may be fastened to the inner surface 49 of the outer panel 25 and the outer surface 48 of the inner panel 20 of the hood shell using conventional fasteners.

In one embodiment, the unitary foam core 100 is activated in a temperature range consistent with the paint bake cycle of a typical automotive painting process. In one embodiment, the heat activated material may flow, cure (e.g. thermosettable), foam, expand (e.g. foam) or a combination thereof upon exposure to heat. One example of a temperature range consistent with paint bake cycle ranges from 300° F. to 400° F., wherein the paint bake cycle may be on the order of 30 minutes.

In one embodiment, in addition to the stiffness enhancement performance provided by the unitary foam core 100, the foam material may further provide acoustic wave attenuation performance. In one embodiment, the foam material be selected to attenuate sound waves and vibrations in a range of frequencies produced by powertrain components and related systems. Typically, this frequency range includes frequencies ranging from about 200 Hz to about 5000 Hz.

In one embodiment, the hybrid material construction of the polymer unitary foam core 100 in combination with the inner and outer panels 20, 25 of the hood shell 15 are an effective noise barrier. In yet another embodiment, the hybrid hood eliminates the need for the insulating blankets that are utilized in traditional hood designs to attenuate the noise generated by the underhood components. Therefore, by eliminating the insulating blanket may reduce the weight of the hood by on the order of approximately 3.0 to approximately 5.0 lbs, or greater, depending on the hood's size and the density of the blanket. Further, since a typical insulating blanket is approximately 6.0 mm thick, by eliminating the insulating blanket, the present invention increases the available stroke dimension between the lower surface of the hood and the upper surface of the underhood component.

It is noted that the foam material is not limited to materials that dampen the above frequency range, since the foam material may be selected for any frequency range required for different applications, so long as the stiffness requirements of the hood are not substantially decreased in a manner that negatively reduces the hood's response to pedestrian head impact.

Some exemplary polymeric foam materials include, but are not limited to, polyurethane, polypropylene, and polystyrene. In another embodiment the core material may be a non-polymer material including, but not limited to, metallic foam, natural, synthetic or recycled fibrous materials or wood. In an even further embodiment, the material of the unitary foam core 100 may have a uniform density therethrough of below approximately 5 lb/ft$^3$ or less; an elastic modulus, in compression, ranging from about 8 to about 15 Mpa; a yield strength of about 0.4 to about 1.5 Mpa; and a Poison's ratio of approximately 0.1 In yet another embodiment, the unitary foam core 100 may have a uniform density therethrough of below approximately 3 lb/ft$^3$. In yet further embodiments, the core material is selected for stability over a temperature range of approximately −30° F. to approximately +140° F. for at least 10 hours. In yet an even further embodiment, the core material is selected for stability over a temperature range of approximately 0° F. to approximately +100° F. for up to 1000 hours with excursions to temperatures on the order of approximately 300° F. for a period of up to approximately ½ of an hour. In another embodiment, the core material is selected to be compatible with aluminum substrates relative to joining and corrosion performance.

One of the advantages of the unitary foam core 100 substantially filling the gap G1 or volume between the inner panel 20 and outer panel 25 (known as resilient regions) is the ability to substantially contained the unitary form core 100 within the substantially gap G1 to substantially maintain the distance between the panels when the hood 5 receives an external force by an object, for example, a pedestrian's head. The unitary foam core 100 is substantially incompressible upon immediate impact, but can be compressed a few millimeters under a sustained load condition. The unitary foam core acts to keep the panels apart. This characteristic provides for a sandwich structure (outer panel-unitary foam core-inner panel) that is substantially rigid such that the panels and unitary foam will act in unison or as one single body and flex or deflect about the same displacement upon impact. For example, the inner panel will deflect or flex about 0.5 mm when the outer panel deflects or flexes about 0.5 mm. Further, the unitary foam core (sandwiched between the panels) also deflects or flexes about 0.5 mm. As long as the panels do not contact each other, the panels will not substantially deform after impact and will spring back substantially to the original position before impact, except for the possible localized dent that may occur at the impact point on the outer surface of the outer panel.

In one embodiment of the present invention, a deformable pan 10 is incorporated into the inner panel 20 (known as plastic deformation or crumple regions) is aligned to an underhood component 42, wherein the deformable pan 10 further increases the clearance between the hood 5 and the underhood component 42. Typically, the plastic deformation or crumple regions are points of weakness designed to deform and crumple first when the deformable pan 10 contacts the underhood component 42. The deformable pan 10 can be formed in the inner panel 20 by the punch as the die exerts pressure on to the flat inner panel 20.

Figure 3:
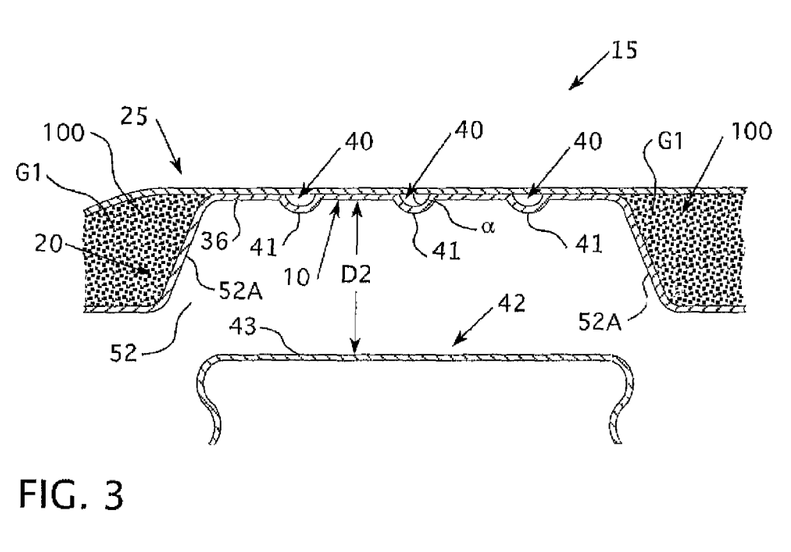
FIG. 3 is a side cross sectional view of one embodiment of a deformable pan, in accordance with the present invention.

Referring to FIG. 3, the dimensions of the deformable pan 10 are substantially complimentary with the opposing underhood component 42 and configured with recess 52, walls 52A, and upper surface 36 to maximize the clearance, also referred to as stroke dimension D2, between the upper surface 36 or walls 52A and the upper surface 43 of the underhood component 42. The recess 52 extends outwardly toward outer panel 25 and substantially aligned with and open to the underhood component 42, thereby reducing D1 and increasing D2. The recess 52 is not designed to contain or hold any shock absorbing material, such as foam, since it is open towards the underhood component 42 and outside the hood shell 15, as described above. Upper surface 36 and walls 52A can elastically deform or flex and the deformable pan 10 can elastically deform during an impact event to minimize or eliminate the incidence of contact of the upper surface 36 or walls 52A to the underhood component 42, hence softening the impact of the pedestrian head to the vehicle hood 5. The deformable pan 10 will spring back to its original configuration as long as the deformable pan does not contact the underhood component 42. In the event, the deformable pan 10 contacts the underhood component 42, the apex 41 of the deformable pan 10 will crumple to reduce the force at which the pedestrian head contacts the underhood component 42 by substantially reducing the pedestrian head's velocity at the point of contact to the underhood component 42.

The underlying hood component 42 may be any engine compartment component that is positioned underlying the deformable pan 10, which in an impact event may come in contact with a pedestrian head as the deformable pan 10 is being deformed. For example, the deformable pan 10 may be positioned offset from the hood's centerline to be aligned to a transversely mounted engine, as depicted in FIG. 1A, or positioned centrally to be aligned to a longitudinally mounted engine, as depicted in FIG. 1B, wherein at least one pan is positioned to be aligned to the highest point of the motor. It is noted that the deformable pan 10 may be aligned with any underhood component and any number of deformable pans 10 have been contemplated and are within the scope of the invention.

Referring to FIG. 1C, the outer surface 51 of the outer panel 25 of the hood shell 15 may be of any design or profile in accordance with the vehicle design, wherein in one embodiment the outer surface 51 has a profile with a generally continuous curvature.

FIG. 2A is a side cross section of the vehicle hood 5 depicted in FIG. 1A, along section line 1-1, and illustrates the inner panel 20 and outer panel 25 of the hood shell 15 at a portion of the vehicle hood 5 at which the inner panel 20 is separated from the outer panel 25 at a central portion of the hood shell 15, and is joined at the perimeter portions 11 at the front, sides, and rear of the hood shell 15. Section line 1-1 is along the centerline of a vehicle hood 5 having an offset deformable pan 10.

FIG. 2B is a side cross section of the vehicle hood 5 depicted in FIG. 1A, along section line 2-2, and illustrates a portion of the hood shell 15 at which the inner panel 20 and outer panel 25 are joined to provide a bonded structure 30, which serves as the upper surface of the deformable pan 10. The deformable pan 10 maximizes the available space between the vehicle hood 5 and the upper surface 43 of an underhood component 42, such as the manifold of an engine (FIG. 3). The sidewalls 52A of the deformable pan 10 are also provided by the inner panel 20 and have a generally S-shaped cross section 35. The S-shaped sidewall of the deformable pan 10 is a configuration that is curved in two directions, the outer portions of which merge into the upper and lower adjacent portions of the inner panel 20 in which it is formed. Contrary to straight or curved sidewalls that form relatively sharp corners with a flat wall that typically result in undesirable stress concentrations, the S-shaped sidewall of the deformable pan 10 results in a more equal stress distribution and minimizes if not totally eliminates inordinate stress concentrations in the areas where the sidewalls of the deformable pan 10 flow into the upper flat bonded structure 30.

Increasing the dimension D2 between the hood shell 15 and an underhood component 42 maximizes the hood's available deformation stroke in an impact event with a pedestrian head. The combined metal thickness of the bonded structure 30 also serves to optimize the hood's 5 structural stiffness and strength to such an impact. The bonded structure 30 provides increased stiffness and strength due to the adhesive engagement of the inner panel 20 and the outer panel 25 in a laminated manner to significantly increase shear strength between the two panels, wherein the bonded structure 30 performs almost equivalent to a singular structure taking advantage of the combined thickness of the inner and outer panel 20, 25. In one embodiment, the adhesive engagement to provide the bonded structure 30 is provided by a single component or two component adhesive. In one embodiment, a single component epoxy provides the adhesive for the bonded structure 30. In one embodiment, a two component epoxy, acrylic or epoxy/acrylic hybrid material provides the adhesive for the bonded structure 30.

Referring to FIGS. 1A and 3, in one embodiment, the deformable pan 10 includes at least one impact absorbing structure having a geometry comprising of an indent space 40 of at least a frustum of sphere having an apex 41 (also known as a crumple feature) facing the underhood component 42. The term "frustum of a sphere" is defined as being less than half of a sphere, in which the angle α formed between the initial sidewall and the base of the sphere is less than 90 degree's. FIG. 3 depicts a side cross sectional view of one embodiment of a deformation pan 10 having a plurality of apexes 41 facing the underhood component 42. The plurality of apexes 41 are configured to deform against the underhood component 42 and soften or moderate the impact of the hood 5 to the underhood component 42 in an impact event in which the hood 5 is deformed to the point of contacting the underhood component 42.

Figure 6:
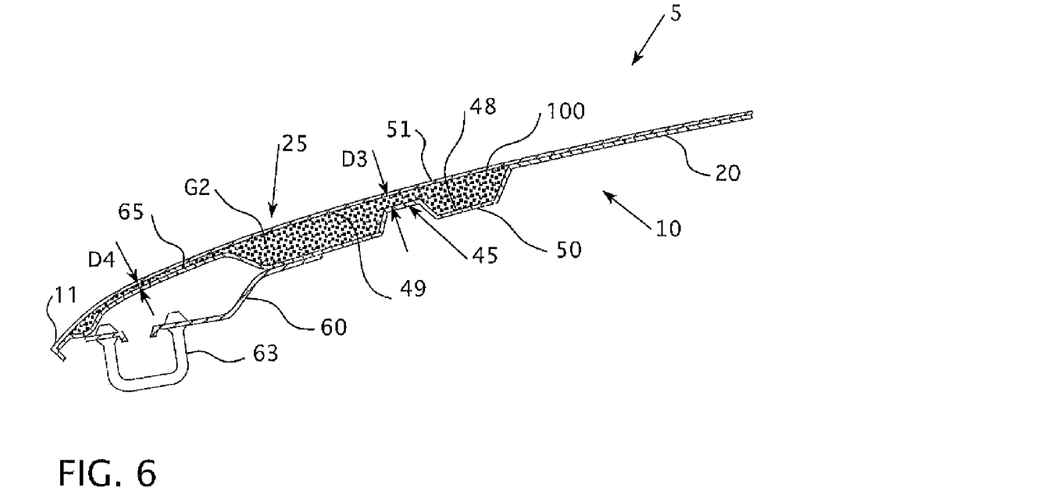
FIG. 6 is a side cross sectional view of another embodiment of a hood structure having a palm reinforcement portion, stiffening member, latch attachment and deformable pan, in accordance with the present invention.

Referring to FIGS. 1A and 6, in one embodiment, the vehicle hood 5 may further include at least one stiffening structure 45. In one embodiment of the present invention, the at least one stiffening structure 45 is at least one cup-shaped element that may be formed by a cylindrical punch and die tool. In one embodiment, the cup-shaped stiffening structure 45 may be made by employing a punch and a die having a substantially cylindrical shape to develop the S-shape sidewall of the cup-shaped stiffening structures 45, as opposed to straight or curved sidewalls that form relatively sharp corners with a flat wall that typically result in undesirable stress concentrations. The S-shaped sidewall of the stiffening structure 45 is a configuration that is curved in two directions, the outer portions of which merge into the upper and lower adjacent portions of the inner panel 20 in which it is formed. This S-shaped sidewall results in a more equal stress distribution and minimizes if not totally eliminates inordinate stress concentrations in the areas where the sidewalls of the cup-shaped stiffening structure 45 flow into the upper flat top portion as well as the cup lower wall portion where it blends into the S-shaped sidewall of an adjacent cup-shaped element.

In one embodiment, the base of the stiffening structure 45 is oblong 45b or circular 45a, but further embodiments having other geometries for the base of the stiffening structure have been contemplated and are within the scope of the present invention, such as multi-sided base configurations including triangular shapes.

Referring to FIG. 2B, the stiffening structure 45 may be provided by forming the inner panel 20 of the hood shell 15 to have an S-shaped sidewall 47 that transitions from the base of the stiffening structure 45 to the stiffening structure's upper surface 46. The upper surface 46 of the inner panel 20 corresponding to the stiffening structure 45 provides an attachment point for the outer surface 48 of the inner panel 20 to the inner surface 49 of the outer panel 25. In one embodiment, the portion of the inner panel 20 that provides the stiffening structure 45 is formed to provide a gap G1 ranging from 2.0 mm to about 4.0 mm between the outer surface 48 of the inner panel 20 at the upper surface 46 of the stiffening structure 45 and the opposing inner surface 49 of the outer panel 25.

In one embodiment, engagement or bonding of the inner panel 20 and the outer panel 25 at the stiffening structure is provided by an expandable adhesive, which fills the gap G1 during manufacture of the hood shell 15. In one embodiment, the expandable adhesive is an anti-flutter adhesive of a polyvinyl chloride plastisol base. In another embodiment, the expandable adhesive is a rubber based or elastomer based system.

Figure 4A:
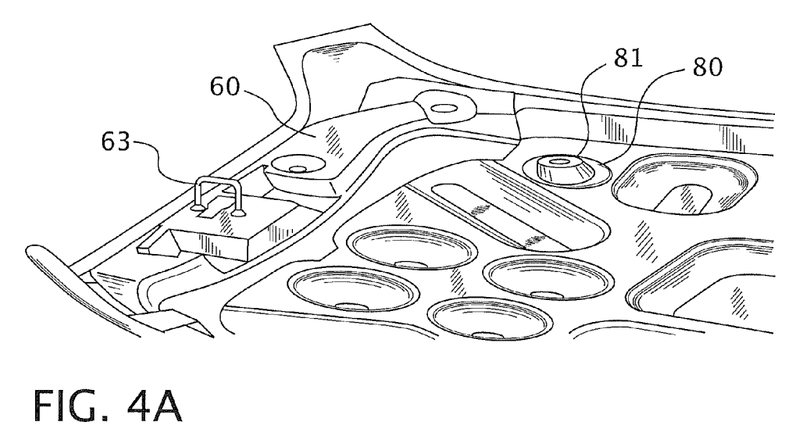
FIGS. 4A and 4B are perspective views of one embodiment of a latch attachment member in accordance with the present invention.

Referring to FIGS. 1A and 4A, in one embodiment, the hood shell 15 may further include hood prop reinforcements 80 formed from the hood shell's 15 inner panel 20. In one embodiment, the hood prop reinforcements 80 are formed into the inner panel 20 using a similar punch and die assembly as used to provide the stiffening structures 45. In one embodiment, the hood prop reinforcements 80 may include an S-shaped sidewall. Similar to the stiffening structures 45, the S-shaped sidewall advantageously equalizes the stress distribution about the hood prop reinforcement 80 and minimizes if not totally eliminates inordinate stress concentrations in the areas where the sidewalls of the hood prop reinforcements 80 flow into the upper flat prop attachment portion 81 as well as the hood prop reinforcement 80 lower wall portion. Contrary to the stiffening structures 45 in which the upper surface 46 of the stiffening structure is facing and engaged to the inner surface 49 of the hood shell's outer panel 25, the upper flat prop attachment portion 81 faces a direction opposed to the inner surface 49 of the hood shell 15. The upper flat prop attachment portion 81 provides for engagement to hood struts and equivalent structures, including but not limited to gas struts.

Referring to FIGS. 1A and 1B, in one embodiment, the vehicle hood 5 further includes a latch attachment member 60 and/or hinge attachment member 70 positioned on the inner surface 50 of the inner panel 20 of the hood shell 15. As opposed to prior hood designs in which the latch and/or hinge attachments 60, 70 are incorporated between the inner panel 20 and the outer panel 25 of the hood shell 15, in one embodiment of the present invention, by attaching the latch and/or hinge attachments 60, 70 to the inner surface 50 of the inner panel 20 a decreased depth of draw required to manufacture the inner panels 20 of the hood shell 15 may be realized. Specifically, as discussed above, prior hood design incorporating reinforcement structures within the hood shell typically require hood shell depths on the order of about 60 mm or greater, more typically requiring a depth ranging from about 50 mm to about 70 mm, whereas the embodiments of the present invention allow for hood shell depths of draw being less than about 30 mm.

It is noted that the latch attachment members 60 and hinge attachment members 70 may be practiced together or separately. It is further noted that embodiments of the present invention have been contemplated in which the latch attachment member 60 and/or hinge attachment member 70 are practiced in conjunction with the deformable pan 10, or are practiced independent of the deformable pan 10.

In one embodiment, the hinge attachment member 70 includes provisions for engagement to hood hinges, wherein engagement may be provided by mechanical fasteners. The hinge attachment member 70 is connected to a portion of the inner surface 50 of the inner panel 20 of the hood shell 15 corresponding to the hood hinge orientation of the vehicle. Although the supplied figures depict that the hinge attachment members 70 are positioned at the windshield end of the hood structure, it is noted that the hinge attachment members may be positioned at the opposing end of the hood.

In one embodiment, the hinge attachment member 70 may include a stamped metal sheet, such as a stamped metal sheet composed of an aluminum alloy. In another embodiment, the hinge attachment member 70 may be formed of other sheet metals, such as steel. In yet another embodiment, the hinge attachment member 70 may be a metal casting, such as cast aluminum or cast magnesium or similar alloys. In an event further embodiment, the hinge attachment member 70 may be formed of a molded high strength polymer, or may include composite materials. The hinge attachment member 70 may be secured to the inner surface 50 of the inner panel 20 mechanically, using nut and bolt arrangements, screws and/or rivets and like fasteners; bonding by adhesives, by fusion methods, such as welding or like processes; or by combinations thereof. In another embodiment, at least one part of the hinge may be integrated into the hinge attachment member 70.

Figure 4B:
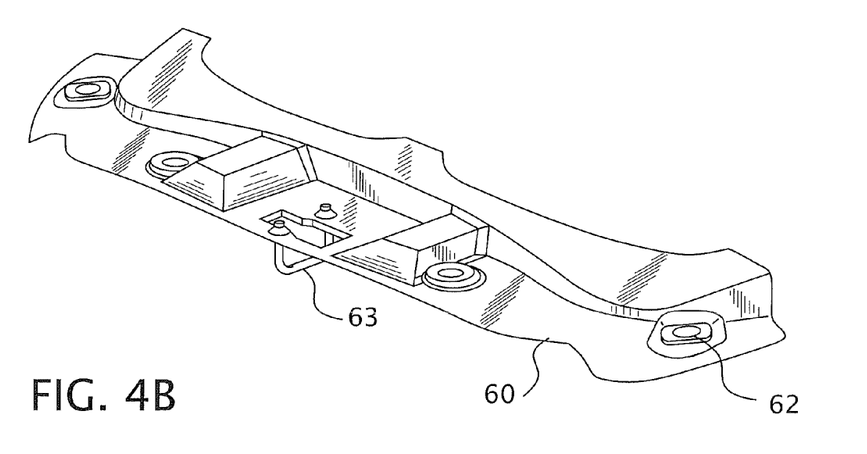

FIGS. 4A and 4B depict perspective views, of one embodiment of a latch attachment member 60 which includes a mechanically attached latch loop 63 and bumper pads 62 that are integrated into the latch attachment member 60. In one embodiment, the latch attachment member 60 may include a stamped metal sheet, such as a metal sheet composed of aluminum. In another embodiment, the latch attachment member 60 may be formed of other sheet metals, such as steel. In one embodiment, the latch attachment member 60 may be a metal casting, such as cast aluminum or cast magnesium. In yet another embodiment, the latch attachment member 60 may be formed of a molded high strength polymer, or may include composite materials.

The latch attachment member 60 may be secured to the inner surface 50 of the inner panel 20 mechanically, using nut and bolt arrangements, screws and/or rivets and like fasteners; bonding by adhesives, by fusion methods, such as welding or like processes; or by combinations thereof. Although the latch attachment member 60 is depicted in each of the supplied figures as being positioned at the front end of the hood structure closest to the front bumper, other embodiments have been contemplated in which the latch attachment member 60 is in closer proximity to the windshield side of the hood depending upon the latch and hinge layout of the vehicle.

Figure 5:
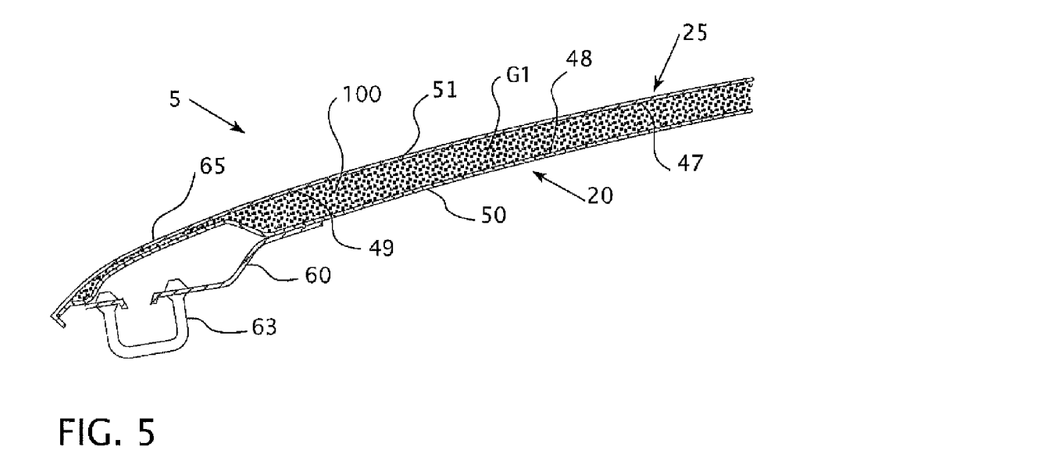
FIG. 5 is a side cross sectional view of one embodiment of a palm reinforcement area of the hood inner panel in conjunction with a latch attachment member, in accordance with the present invention.

Referring to FIGS. 5 and 6, in one embodiment, the inner panel 20 may further include a palm reinforcement portion 65 positioned in proximity of front portion 11 of hood shell 15 corresponding to latch loop 63, wherein palm reinforcement portion 65 is in close proximity (D4 ranging from about 0.5 mm to about 3.0 mm) to the inner surface 49 of the outer panel 25. Further, palm reinforcement portion 65 can be bonded, for example, by an expandable adhesive to the inner surface 49 of the outer panel 25. In one embodiment, the palm reinforcement portion 65 is positioned at points of vehicle hood 5 at which one closing the hood would apply pressure.

In one embodiment, the expandable adhesive is an anti-flutter adhesive of a poly-vinyl chloride plastisol base, such as Betaguard™ available from Dow chemicals. In another embodiment, the expandable adhesive is a rubber based or elastomer based system. In yet another embodiment, the outer surface 48 of the inner panel 20 is directly bound to the inner surface 49 of the outer panel 25 of the palm reinforcement 65 in a laminated manner by adhesive bonding. One example of an adhesive suitable for producing a laminated palm reinforcement 65 in accordance with the present invention is a single component epoxy based adhesive, such as BetaMate™ available from Dow Chemicals. In another embodiment, a two component epoxy/acrylic adhesive provides the adhesive for the laminated palm reinforcement 65, wherein one example of a two component epoxy/acrylic based adhesive includes Versiloc™ available from Lord Inc.

In one embodiment, by positioning a palm reinforcement portion of the inner panel 20 proximate to the outer panel 25 and thus integrally providing the palm area reinforcement, the present invention reduces the depth of draw required to form the inner panel 20, and hence enhances the ease of manufacturing the inner panel 20. Further, the overall strength and stiffness, of the hood shell 15 is maintained and structural performance is not compromised when compared to hoods of prior art. In accordance with the present invention, unlike prior art, the total hood shell does not require increasing the depth of draw of the inner panel to include stiffening structures within the hood shell, therefore decreasing the maximum depth of draw to manufacture the hood than previously possible, while maintaining hood performance from the standpoints of structural stiffness, formability and ease of manufacture.

Referring to FIG. 6, in another embodiment of the present invention, the palm reinforcement portion 65, latch attachment 60, and stiffening members 45 are combined to provide a hood having increased structural performance while facilitating manufacturing. In one aspect, the strength and stiffness of the hood in the region at which pressure is applied during latching of the hood in the closed position is provided by the combination of a latch attachment member 60 being connected to the inner surface 50 of the inner panel 20 in combination with an inner panel 20 that provides a palm reinforcement portion 65 and stiffening members 45.

By connecting the latch and/or hinge attachment members to the inner surface 50 of the inner panel 20, as opposed to being within the hood shell as practiced by the prior art, the distance separating the inner and outer panels 20, 25 in these areas is substantially reduced, and allows for the inner panel 20 to be manufactured using a lesser depth of draw. Additionally, the strength and stiffness is further enhanced by the adhesive bonding of the inner and outer panels of the hood shell in the palm reinforcement portion 64 and stiffening members 45. The reduced depth of draw provided by the reduced cross section of the hood shell 15 and the stiffening member 45 in some instances allows for thinner gauge sheet metal for the inner and outer hood panels 20, 25, hence advantageously decreasing the structure's weight.

Decreasing the depth of draw also facilitates manufacturing of the inner panel 20 and allows for the stiffening members 45 to be formed in closer proximity to and substantially strengthening the portions of the hood corresponding to the latch and hinge assemblies. In another aspect of the present invention a method of forming the above described vehicle hood 5 is provided including the steps of providing an outer panel 25; providing an inner panel 20 having deformable pan 10 portion including a upper surface 36 for engaging a portion of the outer panel 25 and an S-shaped sidewall 35; and joining the outer panel 25 and the inner panel 25 to provide a hood shell 15, wherein the deformable pan 10 is positioned corresponding to an underhood component.

Now turning to FIG. 2B, in one embodiment the hood shell 15 may be formed from stamped metal sheet. In one embodiment, the outer panel 25 may stamped from a metal sheet, such as aluminum, and may have any outer surface profile that is desired by the automotive manufacturer. In one embodiment, the inner panel 20 is stamped from a metal sheet, such as aluminum, to provide the sidewalls 35 and upper surface of the deformable pan 10 and sidewalls 47 and upper surface 46 of the stiffening structures 45 when present.

As described above, the upper surface 36 of deformable pan 10 provided by the inner surface 48 of inner panel 20 is configured to contact the inner surface 49 of the outer panel 25 and adhesively bounded thereto to provide a laminated structure 30. The laminated structure 30 is adhesively joined. As shown in FIG. 6, the portion of the inner panel 20 corresponding to the stiffening structures 45 are configured to be separated from the opposing surface 49 of the outer panel 25 by a gap G2, D3, ranging from 2.0 mm to 4.0 mm, wherein the gap G2 is filled with a high viscosity or expandable adhesive, such as a foam adhesive, during manufacturing of the hood shell 15. In the embodiments of the present invention including a palm reinforcement portion 65 positioned corresponding to the latch mechanism, the portions of the inner panel 20 and outer panel 25 corresponding to the latch mechanism may be formed to contact one another and may be secured by an adhesive. In one embodiment, the perimeter 11 of the hood shell 15 is joined by hemmed engagement of the outer panel 25 to the inner panel 20, wherein in one embodiment the hemmed engagement may be aided by an adhesive.

Figure 7:
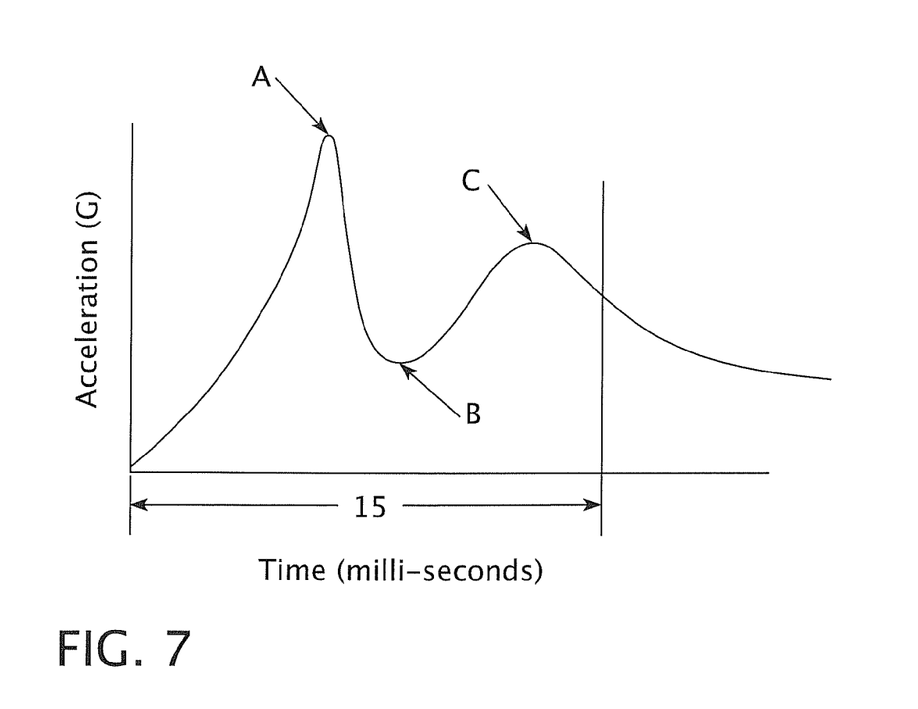
FIG. 7 is a schematic plot depicting the typical acceleration v. time experienced by a pedestrian head against a hood in an impact event.

In one embodiment, the present invention provides a vehicle closure panel that absorbs pedestrian impact energy in an impact event. Referring to FIG. 7, the head injury criteria number (HIC#) is determined by calculations according to a prescribed formula for a period of up to 15 milli-seconds during the impact event. The first peak (point a) represents the maximum g's resulting from a primary impact prior to deformation of the hood. Following the first peak (point a) the hood deforms additionally resulting in a decrease in the acceleration experienced by the pedestrian's head until secondary impact is experienced (point b). The secondary impact may result from deformation of the hood until contacting an underlying hood component. The acceleration experienced following the conclusion of hood deformation or secondary impact may continue until the kinetic energy of the impact is absorbed at a third peak (point c).

A sudden and extreme increase in the second peak (point b) results from the hood contacting an underhood component, such as an engine, resulting in an unacceptably high HIC#. In one embodiment, the present invention provides a vehicle closure panel that absorbs impact energy by maximizing the stroke dimension between the exterior surface of the vehicle closure panel and an underhood component, therefore allowing for maximum deflection prior to contact to the underhood component.

In another aspect of the present invention a lighter closure structure is provided having a thinner depth of cross section, in which at least the latch reinforcing member and the hinge reinforcing member is connected to the outer surface of the inner panel of the closure structure.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents

What is claimed is:
1. A hood comprising:
a hood shell formed by an outer panel and an inner panel, wherein each of the panels have a uniform gauge thickness therethrough, wherein at least one gap is formed between an inner surface of the outer panel and an outer surface of the inner panel, wherein the at least one gap comprises a depth substantially perpendicular to the inner surface of the outer panel;
a resilient region defined by a unitary foam core having a uniform density therethrough that substantially fills a volume of the at least one gap to substantially maintain the depth for reinforcing the hood shell and absorbing energy, wherein the unitary foam core is connected to the inner surface of the outer panel or the outer surface of the inner panel and is substantially contained within the at least one gap when the hood receives contact from an external object such that the outer panel, unitary form core, and inner panel act in unison or as one single body; and
a plastic deformation region defined by at least one recess formed in the inner panel extending outwardly towards the outer panel and substantially aligned with and open to an underhood component when the hood is installed on a vehicle to allow for elastic deformation of the at least one recess when the hood is impacted by the external object;
wherein the at least one recess comprises at least one crumple feature to allow plastic deformation of the at least one recess when the at least one recess contacts the underhood component.

2. The hood according to claim 1 wherein the gap has a maximum depth of less than about 15 mm.

3. The hood according to claim 1 wherein the outer panel and the inner panel are made of an aluminum alloy.

4. The hood according to claim 1 wherein the uniform gauge is 0.8 mm or less.

5. The hood according to claim 1 wherein the unitary foam core is a thermoset or thermoplastic polymer.

6. The hood according to claim 1 wherein the foam core is a heat activated expandable polymer.

7. The hood according to claim 1 wherein the foam core is comprised of epoxy resin, polyurethane, polyethylene, polyester, ethylene vinyl acetate, ethylene propylene diene rubber (EPDM), sturene-butadiene-styrene block copolymers, or mixtures and combinations thereof.

8. The hood according to claim 1 further comprising a hinge attachment member positioned on the outer surface of the inner panel.

9. The hood according to claim 1 wherein the at least one recess comprises sidewalls with an S-shaped side cross section.

10. The hood according to claim 1 wherein the at least one crumple feature includes an impact absorbing structure having a geometry comprising at least a frustum of sphere having an apex facing the underhood component.

11. The hood according to claim 10 wherein the plurality of structures deform against the underhood component when impacted by the external object.

12. The hood according to claim 1 wherein the recess has a circular or multi-sided configuration.

13. The hood according to claim 1 wherein the underhood component is an upper part of an engine.

14. The hood according to claim 1 wherein the hood shell further comprises at least one stiffening structure, wherein a sidewall of the at least one stiffening structure has an S-shaped side cross section.

15. The hood according to claim 14 wherein an inside surface of the inner panel of the hood shell corresponding to the at least one stiffening structure is bonded to an opposing portion of an inside surface of the outer panel by a foamed adhesive.

16. The hood according to claim 15 wherein the portion of the inner panel adhered to the outer panel of the stiffening structure is separated from the inside surface of the outer panel by a dimension of about 2.0 mm to about 4.0 mm.

17. The hood according to claim 1 further comprising a latch attachment member attached to the outer surface of the inner panel.

18. The hood according to claim 17 wherein the inner panel further comprises a palm reinforcement portion in close proximity to a perimeter portion of the hood shell at about the latch attachment member and in close proximity to the inner surface of the outer panel.

19. The hood according to claim 18 wherein the palm reinforcement is about 0.5 mm to about 3.0 mm from the inner surface of the outer panel.

20. A method of forming a vehicle hood comprising the steps of:
providing an outer panel having an inner surface;
providing an inner panel having an outer surface;
providing a unitary foam material on the outer surface of the inner panel or the inner surface of the outer panel;
joining the outer panel and the inner panel to form a hood shell, wherein the inside surface of the outer panel opposes the inner surface of the outer panel; and
activating the unitary foam material to substantially fill a volume between the outer surface of the inner and the inner surface of the outer panel and to engage the outer surface of the inner and the inner surface of the outer panel
characterized in that one recess is formed in the inner panel for defining a plastic deformation region, said at least one recess extending outwardly towards the outer panel and substantially aligned with and open to an underhood component, in particular aligned with and to an upper part of an engine, when the hood is installed on a vehicle to allow for elastic deformation of the at least one recess when the hood is impacted by the external object;
wherein the at least one recess comprises at least one crumple feature to allow plastic deformation of the at least one recess when the at least one recess contacts the underhood component.

* * * * *